H. B. LAYMAN.
CHAIN.
APPLICATION FILED MAY 29, 1916.
1,259,028.
Patented Mar. 12, 1918.
2 SHEETS—SHEET 1.
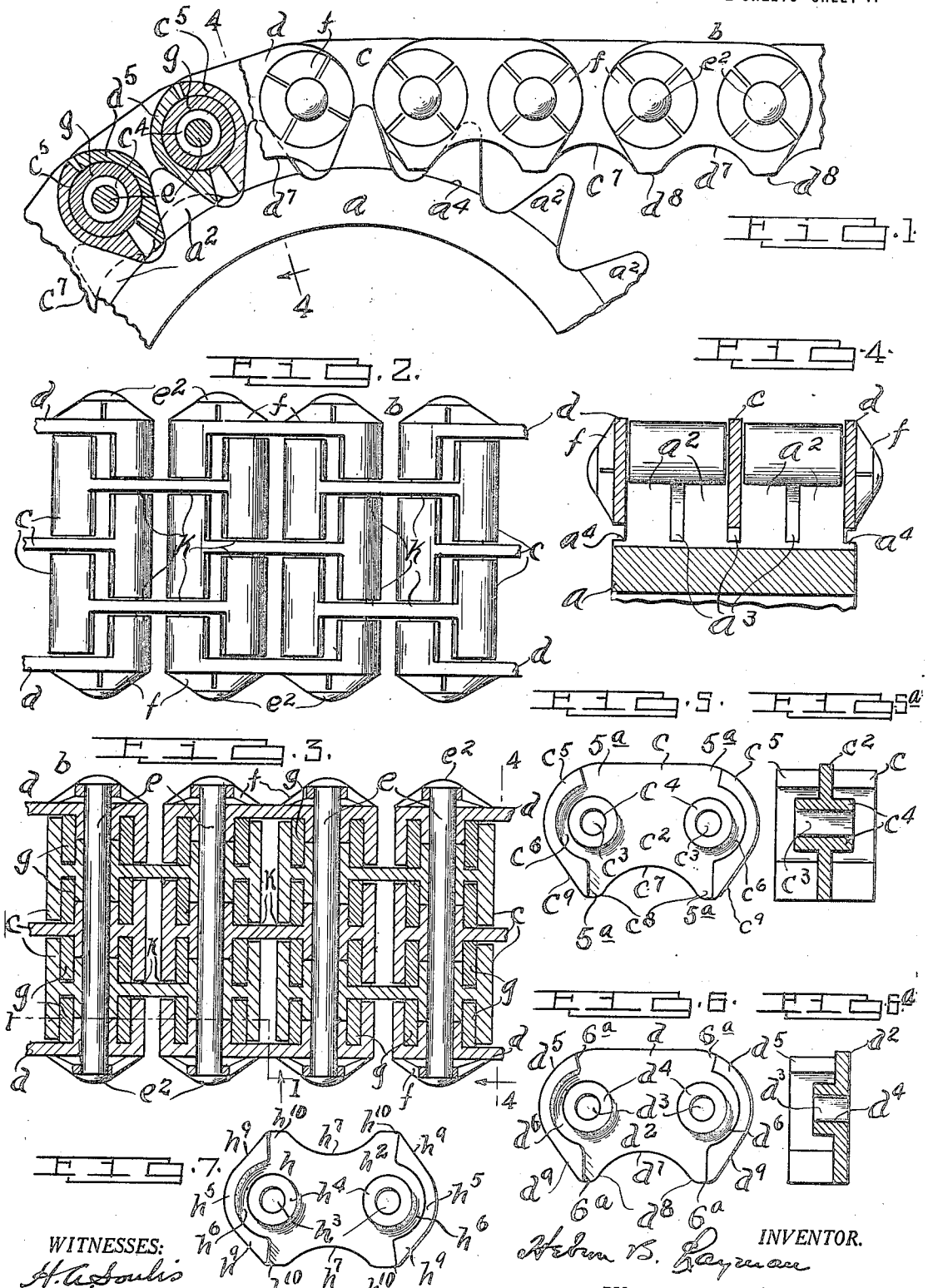
WITNESSES:
INVENTOR.
ATTORNEY

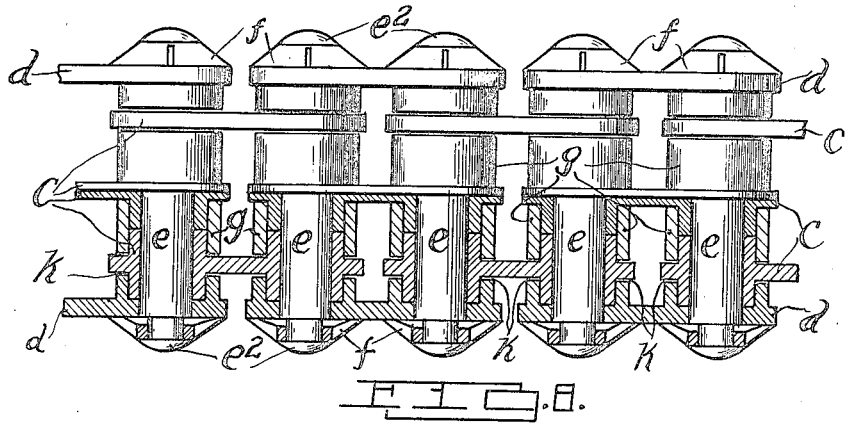
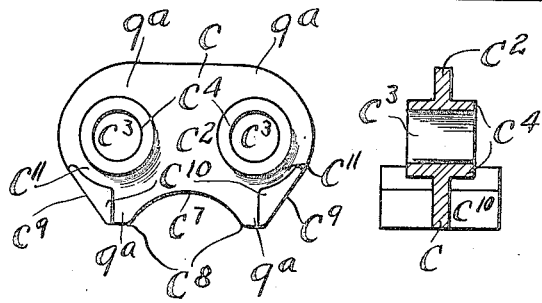
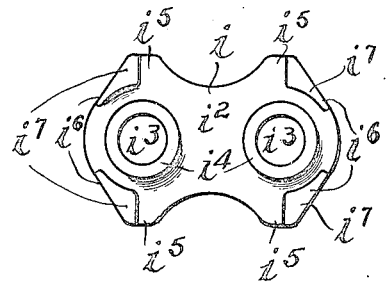
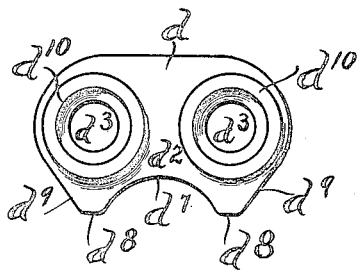
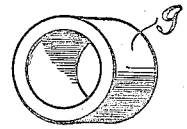
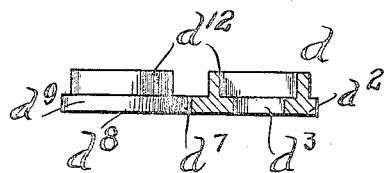

UNITED STATES PATENT OFFICE.

HEBRON BERNARD LAYMAN, OF NEW YORK, N. Y., ASSIGNOR OF ONE-FOURTH TO F. E. LONAS, OF NEW YORK, N. Y.

CHAIN.

1,259,028.  Specification of Letters Patent.  Patented Mar. 12, 1918.

Application filed May 29, 1916. Serial No. 100,565.

*To all whom it may concern:*

Be it known that I, HEBRON BERNARD LAYMAN, a citizen of the United States, and residing at New York, in the county of New York and State of New York, have invented certain new and useful Improvements in Chains, of which the following is a specification, such as will enable those skilled in the art to which it appertains to make and use the same.

This invention relates to chains, especially multiple strand chains and particularly driving chains, and more particularly, but not solely, to "silent" or angular toothed chains.

An object of this invention is to increase the effective bearing area of the links comprising the chain; another object is to increase the contact of the links with the gear, another is to provide a driving chain, in which great strength is secured in proportion to its width and weight. Other objects will appear hereafter in the specification and the claims discernible to those skilled in the art.

The invention is fully disclosed in the following specification, of which the accompanying drawings form a part, in which the separate parts of my invention are designated by suitable reference characters in each of the views, and in which:—

Figure 1 is a side view of a part of a gear or sprocket wheel having a piece of my improved chain mounted thereon and part of which is in section, the section being on the line 1—1 of Fig. 3;—

Fig. 2 a plan view of a part of the chain extended;—

Fig. 3 a horizontal sectional view of the part of the chain shown in Fig. 2;—

Fig. 4 a transverse section on the lines 4—4 of Figs. 1 and 3;—

Fig. 5 a side view of one of the intermediate or central links of the chain;—

Fig. $5^a$ a transverse section on either of the lines $5^a$—$5^a$ of Fig. 5;—

Fig. 6 a side view of one of the side links of the chain;—

Fig. $6^a$ a transverse section on either of the lines $6^a$—$6^a$ of Fig. 6;—

Fig. 7 a view similar to Fig. 5 but showing a modified form of link used in a chain designed to gear on both sides of the pitch line;—

Fig. 8 a view similar to Fig. 2 but partly in section and showing a modification;—

Fig. 9 a view similar to Fig. 5 but showing a modified form of a central link;—

Fig. $9^a$ a transverse section on either of the lines $9^a$—$9^a$ of Fig. 9;—

Fig. 10 a view showing a double toothed link, combining the features of Figs. 7 and 9;—

Fig. 11 a side view of a side link used in the construction shown in Fig. 8;—

Fig. $11^a$ a bottom edge view of the link shown in Fig. 11, and partly in section; and Fig. 12 a perspective view of a bearing sleeve used in connection with the form of chains shown in both Figs. 3 and 8.

In the accompanying drawings $a$ is a part of the rim of a gear or sprocket wheel that may be used with my new chain. Its sprockets or teeth $a^2$ are cut circumferentially to form deep recesses, $a^3$ to receive the central web portions of the intermediate links of the chain. The ends of the gear teeth are also provided with recesses $a^4$ to receive the central web of the side links.

The chain $b$ is composed of central links $c$ and side links $d$ shown detached in Figs. 5 and 6 respectively. The links $c$ consist of a body or web portion $c^2$ the ends of which are approximately arc-shaped, and said body or web portion is provided in the opposite ends thereof with pin holes $c^3$ around which are pivot bearings $c^4$ which as shown project at each side of the body or web portion, and with supplemental arc-shaped bearings $c^5$ which are of greater transverse dimensions than the bushing bearings $c^4$, and between which and said pivot bearings are grooves $c^6$. The bottom edge of the web or body portions of the links $c$ is cut out, as shown at $c^7$, to form arc-shaped recesses and the end portions form angular teeth $c^8$ which mesh with the teeth of the gear. The outer side faces $c^9$ of the said sprockets or teeth $c^8$ form bearing surfaces for the teeth of the gear, and these bearing surfaces $c^9$ equal in width the thickness of the arc-shaped bearings $c^5$.

The side links $d$ of the chain are similar to the central links $c$ except that the bushing bearings $d^4$ around the pin holes $d^3$ are on one side only of the body or web portions $d^2$ as are also the arc-shaped bearings $d^5$, and the corresponding grooves $d^6$. The body or web portion is cut out to form an arc-shaped recess $d^7$, and the end portions form the sprockets or teeth $d^8$ having bearing surfaces $d^9$, which mesh with the teeth of the gear.

The links are connected by tie pins $e$ passed through the pin holes of the central and side links, and said pins are provided at their ends with spring washers $f$ which bear on the side links, and the ends of said pins are riveted, as shown at $e^2$.

In assembling the links $c$ and $d$ and connecting them, as shown, by the pins $e$, I mount in the grooves $c^6$ and $d^6$ around the bushing bearings $c^4$ and $d^4$, supplemental independent sleeve bearings $g$ one of which is shown detached in Fig. 12, and when the links are connected in this manner, the side and central links have continuous bearings on the pins $e$ and the independent sleeve bearings $g$ inclose and overlap the pivot bearings of the separate links, and the supplemental arc-shaped bearings $c^5$ and $d^5$ of the links $c$ and $d$ overlap and bear on the independent supplemental sleeve bearings $g$, as clearly shown in Fig. 3, and strain upon any of the transverse series of links is exerted on and taken up by the interlocking, overlapping bearings $c^4$ and $d^4$ of the separate links, the supplemental independent sleeve bearings $g$ and the arc-shaped bearings $c^5$ and $d^5$ of the separate links, and the danger of the shearing or breaking the tie pins is reduced to a minimum, if not rendered impossible.

In the operation of the chain and gear shown, the central body portions $c^2$ of the intermediate or central links pass through the circumferential recesses $a^3$ in the teeth $a^2$ of the gear, and the web or body portions of the side links $d$ pass through or operate in the recesses $a^4$ in the teeth $a^2$ of the gear, as clearly shown in Fig. 4, and this holds the chain on the gear and no independent guide plates are necessary.

Obviously I may apply my invention to the common form of "silent" chain link, in which the body or the webbed portion of the link is cut out to straddle the teeth of the gear, but one of the features of the form of link which I have shown in the drawings by way of example, is that as a line drawn between the centers of the pin holes $c^3$ and $d^3$ would divide the body or web portion of the link approximately centrally thereof, "springing" of the links and the consequent alteration of the included angle of the link faces is entirely obviated.

In Fig. 7 I have shown a link $h$ in all respects similar to the central or intermediate link $c$, and designated by corresponding reference characters, but toothed on both sides of the pitch line. The various parts of this link $h$ here designated $h^2$, $h^3$, $h^4$, $h^5$, $h^6$, $h^7$, $h^9$ and $h^{10}$ correspond with the parts $c^2$, $c^3$, $c^4$, $c^5$, $c^6$, $c^7$, $c^9$ and $c^{10}$, of the previously described intermediate links $c$.

In the construction shown in Figs. 8 to 12 inclusive the form of the central links $c$ is modified by omitting the central and top portions of the supplemental arc-shaped bearings $c^5$ at the ends of the body or web portion of said links, and by reinforcing the bearing surfaces $c^9$ of the sprocket or teeth $c^8$ by means of bearing lugs or projections $c^{10}$ on the opposite sides of said sprockets or teeth and between which and the bushing bearings $c^4$ are grooves $c^{11}$ in which the supplemental sleeve bearings $g$ fit when the links are connected to form a chain, as shown in Fig. 8.

In this form of construction the supplemental arc-shaped bearings $d^5$ are entirely omitted from the side links $d$ shown in Figs. 11 and 11$^a$ and the opposite sides of the sprockets or teeth $d^8$ are not reinforced to form greater bearing surfaces $d^9$. The side links $d$, however, are provided on their inner sides and around the pin holes $d^3$ with annular bearings $d^{10}$ which are of greater diameter than said pin holes and within which the bearings $c^4$ of the adjacent intermediate or central links $c$ fit when the links are assembled to form the chain, as shown in Fig. 8.

The supplemental independent sleeve bearing $g$ is also employed in this construction, and when assembled the links have a bearing extending the full length of the tie pins, and the interlocking of the bearings $d^{10}$ of the side links with the corresponding bushing bearings $c^4$ on the outer sides of the adjacent central or intermediate links, and the supplemental sleeve bearings $g$ mounted between the body or web portions of the central or intermediate links produce an interlocking and binding of the links one upon another which distributes any pull or strain on the chain throughout the transverse dimensions of the coupled ends of said links so that the shearing or breaking of said pins is impossible.

The double-toothed link $i$ shown in Fig. 10 is intended for use in the same manner as the link shown in Fig. 7, but in connection with the style of the intermediate or central links and side links shown in Figs. 9 and 11 for making "cross" chains, and comprises a body or web portion $i^2$ having pin holes $i^3$ in its opposite end portions and around which are bushing bearings $i^4$, and said link is also provided with oppositely directed sprocket teeth $i^5$ the bearing surfaces $i^6$ of which, or the surfaces on which the teeth of the gear operate, are reinforced on both sides by bearing lugs or projections $i^7$.

I may also provide clearance spaces $k$ between the bearings $c^5$ and $d^5$ of the links $c$ and $d$ and the web portions of said links, the object of which is to prevent unnecessary friction, binding or gripping occasioned by abraded material.

In the construction shown, the bearings $c^4$, $d^4$ and $h^4$ of the links $c$, $d$ and $h$, and the bearings $i^4$ of the link $i$ are all annular bearings which form complete circles, but this is not absolutely essential, and other forms may be employed, and other changes in and modifications of the construction described may be made, within the scope of the appended claims, without departing from the spirit of my invention or sacrificing its advantages.

In the accompanying drawings the intermediate links $c$ are of I shape in cross section, while the side links $d$ are half I shape in cross section. Obviously I may form the chain entirely of links such as $d$ in the accompanying drawings.

I do not bind myself to any particular manner of making the links; I may form them by die-casting, or by coining, or from sheet metal stampings, or in any other desired manner, and while I have shown the bearings $c^4$ and $c^5$ of the intermediate links, and the bearings $d^4$ and $d^5$ of the side links as made integral with the web or body portions $c^2$ and $d^2$ respectively, I do not limit myself to this construction, and I may apply one or both of these bearings to the body portion.

I have shown the rivets as cylindrical, but I may employ tubular rivets, or substitute any commonly known form of rivet or tie pin or pivot pin, whether circular in cross section or not. Furthermore, I do not limit myself to "silent" or angular tooth chains, but may apply my invention to any and all of the commonly known forms of chains.

Having fully described my invention what I claim as new and desire to secure by Letters Patent, is:—

1. A power device of the class described comprising a gear the rim of which is provided with transverse teeth having deep circumferential recesses, and a drive chain adapted to be mounted on said gear and composed of tie pins and links having flat body or web portions movable through said recesses, said links being arranged in transverse series and being provided in their opposite end portions with pin holes through which are passed the tie pins, and the body portions of said links being provided with bushing bearings around said pin holes which project on the opposite sides of said body portions and the inner side portions of which abut when the links are connected in series by said tie pins, and independent sleeve bearings placed on and inclosing the abutting ends of said bushing bearings.

2. A power device of the class described comprising a gear the rim of which is provided with transverse teeth having deep circumferential recesses the ends of which are provided with corresponding recesses, and a drive chain adapted to be mounted on said gear and composed of central or intermediate and side links, the central or intermediate links being provided with web or body portions movable through said circumferential recesses, and the side links being provided with web or body portions movable in said corresponding recesses, all of said links being provided in their opposite end portions with pin holes, tie pins passed through said holes and connecting said links in transverse series, the central or intermediate links being provided around said pin holes with bushing bearings which abut between the body or web portions of said central or intermediate links, and independent sleeve bearings mounted on and inclosing the abutting ends of said bushing bearings.

3. A power device of the class described comprising a gear the rim of which is provided with transverse teeth having deep circumferential recesses the ends of which are provided with corresponding recesses, and a drive chain adapted to be mounted on said gear and composed of central or intermediate and side links, the central or intermediate links being provided with web or body portions movable through said circumferential recesses, and the side links being provided with web or body portions movable in or through said corresponding recesses, all of said links being provided in their end portions with pin holes, tie pins passed through said holes and connecting said links in transverse series, the central or intermediate links being also provided with bushing bearings around the pin holes therein which project at each side of the body portions thereof, and the side links being provided on their inner sides with similar bushing bearings, all of which bushing bearings abut, and supplemental independent sleeve bearings mounted on and inclosing the abutting ends of the bushing bearings.

4. A power device of the class described comprising a gear the rim of which is provided with transverse teeth having deep circumferential recesses the ends of which are provided with corresponding recesses, and a drive chain adapted to be mounted on said gear and composed of central or intermediate and side links, the central or intermediate links being provided with web or body portions movable in or through said circumferential recesses, all of said links being provided in their end portions with pin holes, tie pins passed through said holes and connecting said links in transverse series, the central or intermediate links being also provided with bushing bearings around the pin holes therein which project at each side of the body portions thereof, and the side links being provided on their inner sides with similar bushing bearings, all of which bushing bearings abut, and supplemental independent sleeve bearings mounted on and inclosing the abutting ends of the bushing bearings, said central or intermediate links and said side links being also provided with supplemental end arc-shaped bearings which overlap the independent sleeve bearings.

5. A chain of the class described composed of central or intermediate and side links provided in their ends with pin holes, tie pins passed through said pin holes and connecting said links in transverse series, the pin holes of the central or intermediate links being provided with bushing bearings which abut between the body or web portions of said central or intermediate links, and independent sleeve bearings placed on and inclosing the abutting ends of said bushing bearings.

6. A chain of the class described composed of central or intermediate and side links having pin holes in their opposite ends, tie pins passed through said pin holes and connecting said links in transverse series, the pin holes of the central or intermediate links being provided with bushing bearings which abut between the body or web portions of said central or intermediate links, and independent sleeve bearings placed on and inclosing the abutting ends of said bushing bearings, the side links being provided around the pin holes therein with annular bearings which inclose the corresponding ends of the bushing bearings on the corresponding sides of the adjacent central or intermediate links.

7. In a chain, a link having a projecting bearing in one end portion, and an arc-shaped bearing concentric therewith and spaced therefrom by an arc-shaped groove and a bearing thimble for said link.

8. In a chain, a pair of links having laterally projecting ends provided with arc-shaped bearings, and other bearings spaced therefrom by arc-shaped grooves, and a thimble placed in said grooves and embraced by the laterally projecting ends of the links.

9. In a chain, a pair of links each having a laterally projecting end constituting an arc-shaped bearing and a gear face, a second bearing spaced therefrom by an arc-shaped groove, and a thimble in said groove embraced by the laterally projecting end of each link of said pair.

In testimony that I claim the foregoing as my invention, I have signed my name in presence of the subscribing witnesses this 15th day of May, 1916.

HEBRON BERNARD LAYMAN.

Witnesses:
M. C. MEYER,
H. A. SOULIS.